(12) United States Patent
Frassineti et al.

(10) Patent No.: US 8,339,773 B2
(45) Date of Patent: Dec. 25, 2012

(54) DEVICE FOR CONNECTING AN ELECTRIC LINE TO A CIRCUIT BREAKER

(75) Inventors: Giovanni Frassineti, Mozzo (IT); Federico Gamba, Bergamo (IT)

(73) Assignee: ABB S.p.A., Milan (IT)

( * ) Notice: Subject to any disclaimer, the term of this patent is extended or adjusted under 35 U.S.C. 154(b) by 122 days.

(21) Appl. No.: 12/788,873

(22) Filed: May 27, 2010

(65) Prior Publication Data

US 2010/0304590 A1 Dec. 2, 2010

(51) Int. Cl.
*H05K 7/20* (2006.01)

(52) U.S. Cl. ........ 361/677; 361/611; 361/624; 361/637; 361/648; 361/689; 200/289; 439/620.01

(58) Field of Classification Search ............... 361/611, 361/624, 637, 644, 648, 652, 676, 677, 688–689
See application file for complete search history.

(56) References Cited

U.S. PATENT DOCUMENTS

| | | | |
|---|---|---|---|
| 3,662,137 A | | 5/1972 | Cleaveland |
| 3,728,585 A | | 4/1973 | Olashaw |
| 3,778,680 A | | 12/1973 | Vaneerden |
| 4,005,297 A | * | 1/1977 | Cleaveland .................. 218/118 |
| 4,650,939 A | * | 3/1987 | Milianowicz ................. 218/118 |
| 4,830,630 A | * | 5/1989 | Dozier ..................... 439/620.29 |
| 2005/0136719 A1 | * | 6/2005 | Fontana et al. ............... 439/212 |
| 2005/0224215 A1 | * | 10/2005 | Hsu .......................... 165/104.26 |
| 2010/0301980 A1 | * | 12/2010 | Bergamini et al. ............ 336/61 |
| 2010/0302715 A1 | * | 12/2010 | Bortoli et al. ................ 361/676 |

FOREIGN PATENT DOCUMENTS

JP 2004095530 A 3/2004

OTHER PUBLICATIONS

Ministero dello Sviluppo Economico Italian Search Report No. IT BG20090030 dated Nov. 24, 2009.

* cited by examiner

*Primary Examiner* — Courtney Smith
(74) *Attorney, Agent, or Firm* — Melissa J. Szczepanik; Paul R. Katterle

(57) ABSTRACT

A device for connecting an electric line to a connection terminal for direct or indirect connection with a circuit breaker, which comprises at least one first electrically conducting body having a first end portion intended to be operatively connected to the terminal, and a second end portion intended to be operatively connected to a conductor element of the electric line, and at least one thermal conducting body comprising a hermetically sealed cavity containing a cooling fluid. The thermal conducting body is operatively coupled to the first electrically conducting body such that the hermetically sealed cavity has a first surface arranged in proximity to the first end portion and a second surface arranged in proximity to the second end portion.

14 Claims, 11 Drawing Sheets

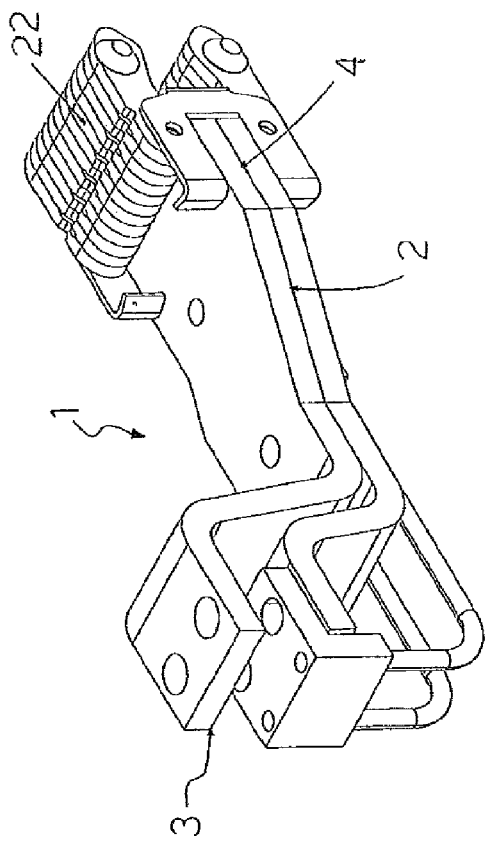
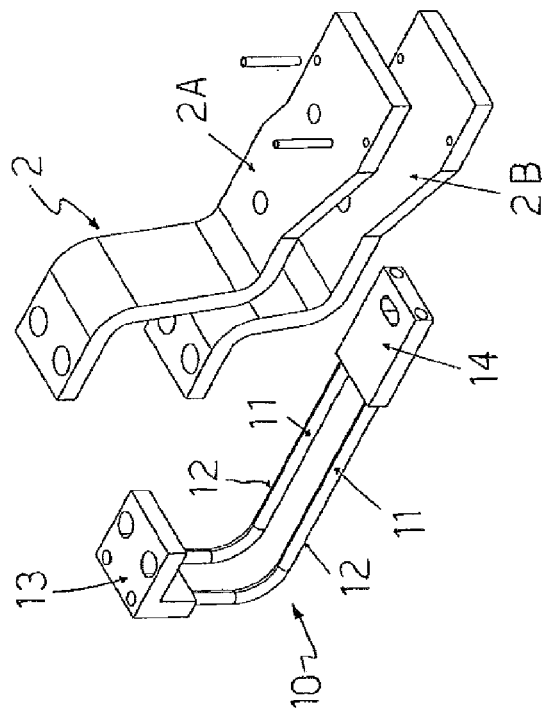

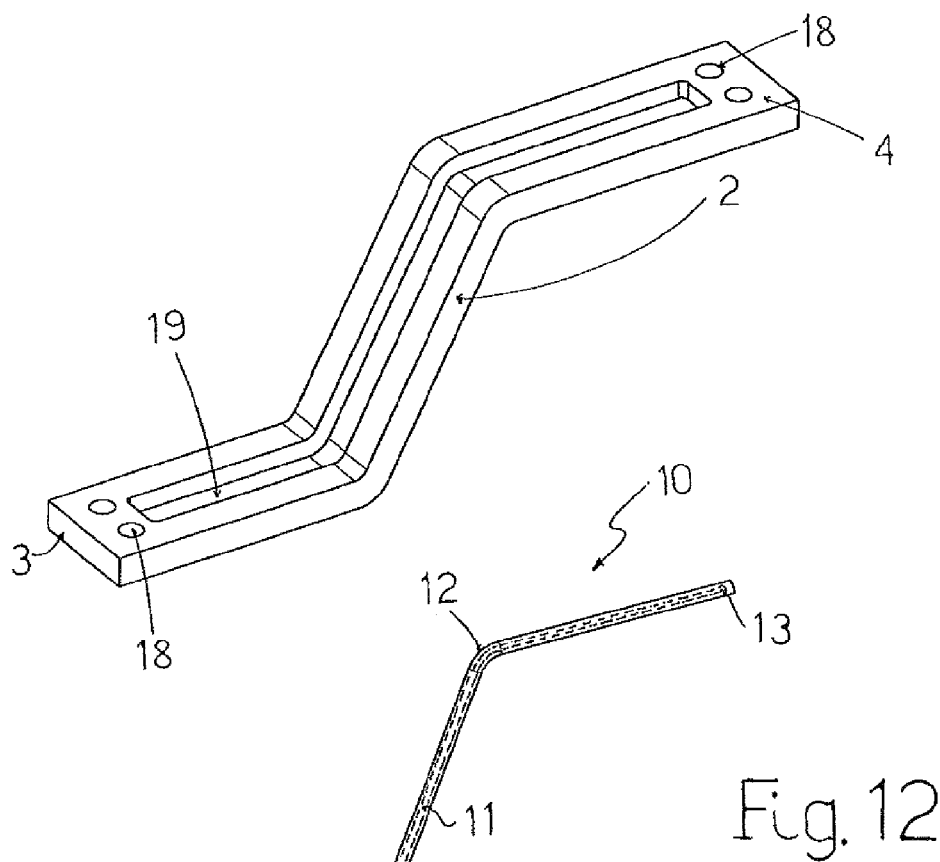
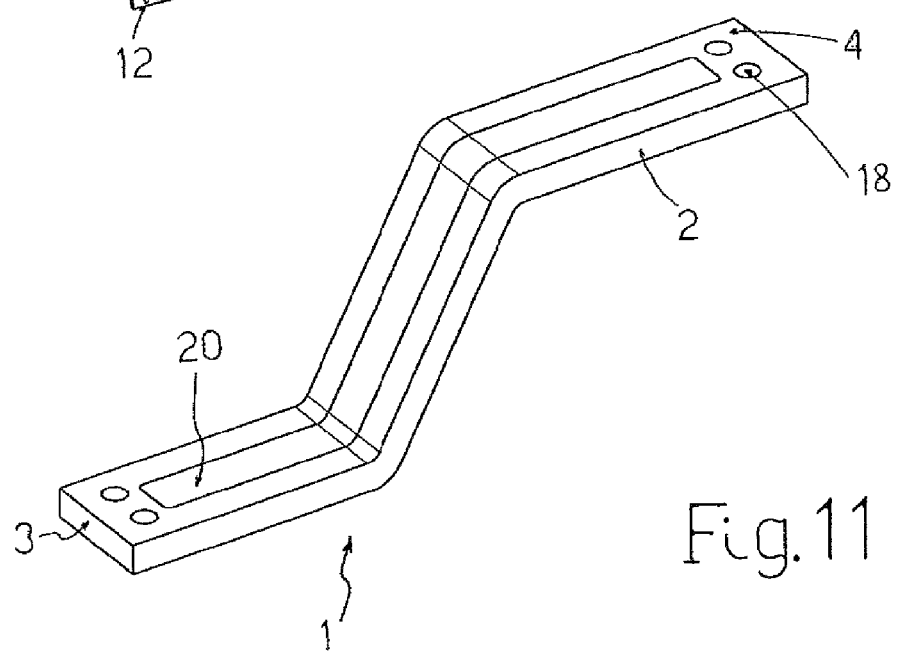

DEVICE FOR CONNECTING AN ELECTRIC LINE TO A CIRCUIT BREAKER

CROSS-REFERENCE TO RELATED APPLICATION

This application claims priority under 35 U.S.C. §119(a)-(d) to Italian Patent Application Number BG2009A000030, filed on May 28, 2009, the entire contents of which are hereby incorporated by reference.

BACKGROUND OF THE INVENTION

The present invention relates to a device for connecting an electric line to a connection terminal with a circuit breaker, and in particular to a connection device that in addition to enabling the electrical connection of the circuit breaker to an electric line, makes it possible to extract heat from the circuit breaker and transfer it to the electric line itself.

As known, low voltage breaking devices (that is for applications with nominal voltages up to 1000V AC/1500V DC), such as automatic circuit breakers, disconnectors, and contactors, commonly referred to as "switching devices" and hereinafter collectively referred to as circuit breakers, are devices designed for allowing correct operation of specific parts of electrical systems and installed loads.

Such devices are usually installed inside distribution switchboards located in electrical systems. Distribution switchboards normally comprise suitable cells or cubicles arranged for connecting the devices to the electrical power distribution lines. Distribution lines are normally constituted by systems of conductors, such as bus bars and/or cables. The use of appropriate distribution switchboards, in addition to improving practicality, ergonomics of use, and the aesthetic appearance of the systems, contributes to maintain over time adequate safety conditions and correct functionality of all installed parts.

The choice of the devices to be used and their installation methods thereof, should be compatible with the technical characteristics of the distribution switchboard. This compatibility relates to electrical, dimensional, mechanical, and thermal aspects. For circuit breakers, there are three main installation configurations in the switchboards.

In particular, a first installation method for circuit breakers is the so-called "fixed" execution wherein the electrical terminals of the circuit breaker are directly and stably connected to the conductors of the distribution lines. Such connection is normally done by using clamps or screws.

A second installation method for circuit breakers is the so-called plug-in execution wherein special adapter devices are used which are mechanically connected to the switchboard, and connected stably to the conductors of the distribution lines by means of their own electrical terminals; each circuit breaker is mechanically coupled to a corresponding adapter device and by means of appropriate plug-in electrical terminals, it realizes the electrical connection to the distribution line; plug-in coupling normally includes plug-socket type mechanisms.

A third installation method for the circuit breakers is the so-called withdrawable execution; it is substantially an evolution of the preceding removable method, wherein accessory elements are added such as guide and/or support and/or movement means for facilitating plugging and withdrawal operations of the circuit breaker.

Of these three installation methods, the first one is the simplest and cheapest, but it is only suitable to definitive solutions and in any case non-flexible; on the other hand, the removable and withdrawable-type methods offer a greater flexibility. These in fact allow (once the adapter is secured in the switchboard) very quick and totally safe installation or removal of the circuit breaker and, above all, without having to intervene directly on the distribution line.

Installations of circuit breakers of the removable and withdrawable-type do have at least one disadvantage with regard to the fixed-type installation. In order to realize plug-in junction (plug/socket), it is in fact necessary to introduce at least one additional electrical connector element. Considering the assembly composed by the circuit breaker and its related adapter, it is in fact possible to schematize each of its poles or branches as an electrical chain consisting of elements mutually placed in series. In such electrical chain, each element contributes to increase the electrical resistance (or analogously deteriorate the overall conductivity) and thus constitutes a potential source of heat due to the Joule effect.

The undesired heat is generated both in the various conducting sections (for example made of copper) and, above all, at each of the present electrical couplings. The various junctions present, and in particular the plug/socket plugs and the main contacts of the circuit breaker, which by their nature cannot be soldered, in fact introduce similar micro-discontinuities where conspicuous localized increases of electrical resistance can be found. In practice, the most critical energy dispersion peaks due to the Joule effect, with consequent undesirable heat production, tend to occur in these areas.

As can be seen, the heat that is generated due to these dispersions contributes to increase the temperature of the system consisting of circuit breaker, cubicle and switchboard. But since the temperature of the circuit breaker and the temperature of the switchboard should be maintained within predefined operating limits, any undesired increase of electrical resistance in the conducting branches of the system consisting of the circuit breaker and its related adapter compels limiting the power that can be drawn by an apparatus. In addition, the temperature can negatively influence the operation of the circuit breakers. It is likewise known that the temperature of the circuit breaker tends to increase more rapidly if the characteristics of the used adapter, of the cubicle, and of the switchboard favor the accumulation of heat. In practice, with appropriate computations, it is possible to define the maximum fraction of full theoretical load at which a circuit breaker can function in safe condition when it is installed in the cubicle of a switchboard. The fraction of the actually usable maximum load (with respect to the theoretical nominal capacity) is generally expressed in the form of "derating" coefficients that are based on the overall effective conditions of installation. These installation conditions take account of the combination of the characteristics of circuit breaker, adapters, cubicle, switchboard, external environment, etc.

Besides the constraints associated with derating, it is therefore desirable to maintain the operating temperature of the circuit breakers at low levels; it is well known in fact that the higher the operating temperature is, the lower the life span of the circuit breaker or of its more sensitive components.

Many solutions have been introduced by various manufacturers in order to reduce the electrical resistance of the poles of the circuit breakers and the electrical contact resistance of the electrical coupling between the circuit breaker and the adapter, and/or in order to improve the overall thermal efficiency of the switchboard.

Although these well-known solutions certainly provide some technical benefits, there is room and necessity for further improvements.

SUMMARY OF THE INVENTION

Therefore, the present invention is directed toward addressing the aforementioned problems by improving the cooling of a circuit breaker, as well as the overall electrical switchboard within which the circuit breaker is disposed.

In accordance with the present invention, a device is provided for connecting an electric line to a connection terminal for direct or indirect connection with a circuit breaker. The device includes at least one first electrically conducting body having a first end portion intended to be operatively connected to the terminal, and a second end portion intended to be operatively connected to a conductor element of the electric line. The device further includes at least one thermal conducting body having a hermetically sealed cavity that contains a cooling fluid. The at least one thermal conducting body is operatively coupled to the first electrically conducting body such that the hermetically sealed cavity has a first surface arranged in proximity to the first end portion and a second surface arranged in proximity to the second end portion.

BRIEF DESCRIPTION OF THE DRAWINGS

Further characteristics and advantages will become more apparent from the description of some preferred but not exclusive embodiments of the device according to the invention, illustrated only by way of non-limiting examples with the aid of the accompanying drawings, wherein:

FIG. 1 is a perspective view representing a first embodiment of the connection device according to the invention;

FIG. 2 is an exploded view of the device illustrated in FIG. 1;

FIG. 11 is a perspective view representing a further embodiment of the connection device according to the invention;

FIG. 12 is an exploded view of the device illustrated in FIG. 11; and

DETAILED DESCRIPTION OF ILLUSTRATIVE EMBODIMENTS

Figure 3:
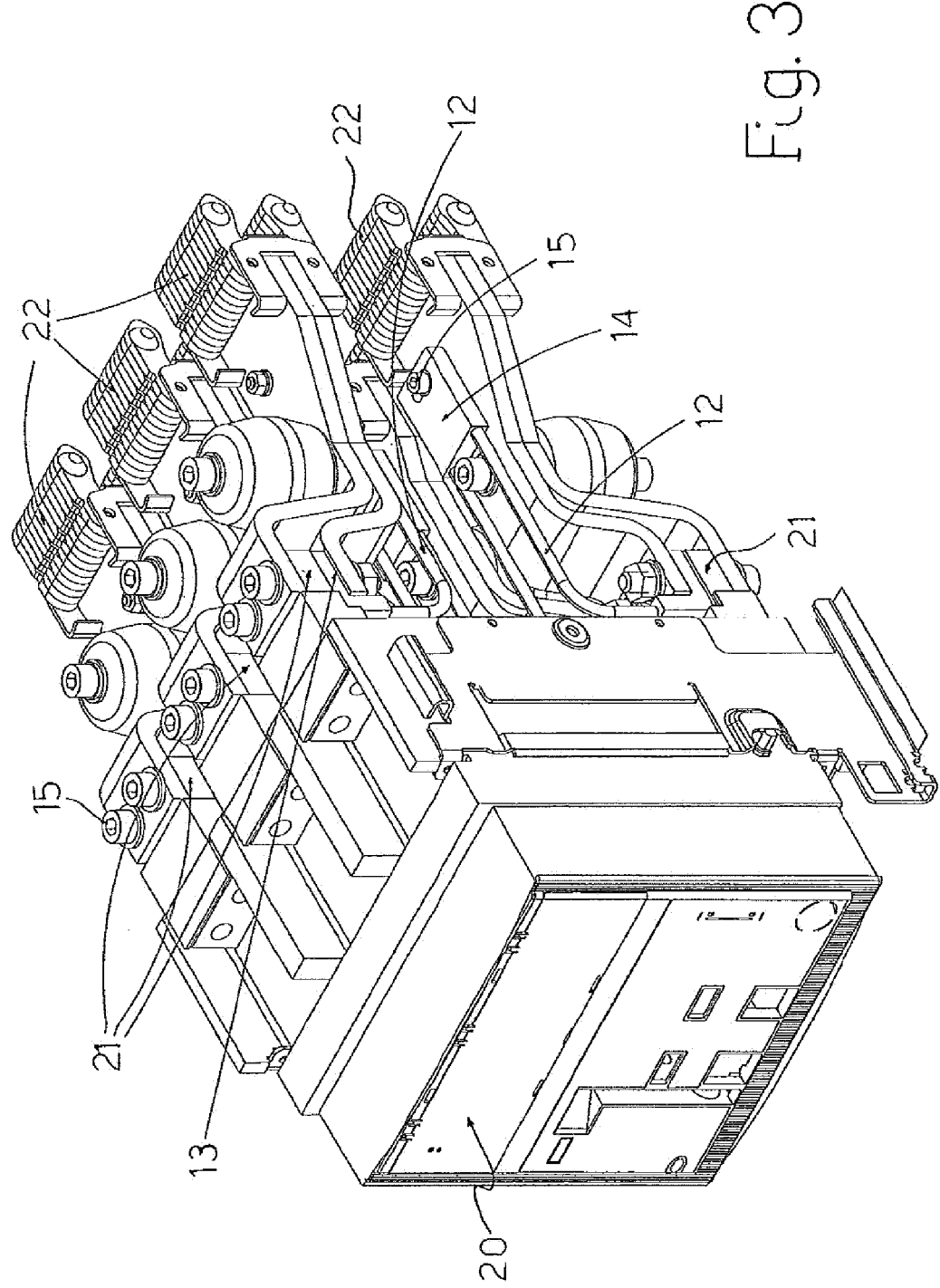
FIG. 3 is a perspective view representing a low-voltage circuit breaker connected to a series of contact clips by means of a plurality of devices of the type illustrated in FIGS. 1 and 2.

In the following description specific reference will be made to the use of the connection device according to the invention for connecting an electric line to one or more terminals of a circuit breaker, without intending in any way to limit its scope of application to other electrical switching or breaking devices; by the definition of circuit breaker it is to be understood any electrical breaking or switching device that is capable of passing from an open state to a closed state (and vice versa) and of breaking/restoring the current flow in an electrical circuit associated with it; such device can be constituted, for example, but not limited to, by a disconnector, or contactor, or an automatic switch (circuit breaker), namely a switching device designed ad hoc to intervene in the presence of significant electrical failure, etc.

In addition, in the following description reference will be made to the connection of a single terminal of the circuit breaker to a corresponding conductor element of the associated electric line; this description is clearly to be understood to be applicable in entirely analogous manner to all terminals of the circuit breaker and related conductor elements of the electric line.

With reference to the drawings, the connection device according to the invention, indicated overall by reference number 1, comprises at least one first body 2, which is made of an electrically conducting material, for example, copper or aluminium, and has at least one first end portion 3 and a second end portion 4.

The first portion 3 is intended in the installation phase to be connected to a circuit breaker 20, particularly to one of the terminals 21 the circuit breaker 20 is equipped with for input and output electrical connection with an associated electric line.

Figure 13:
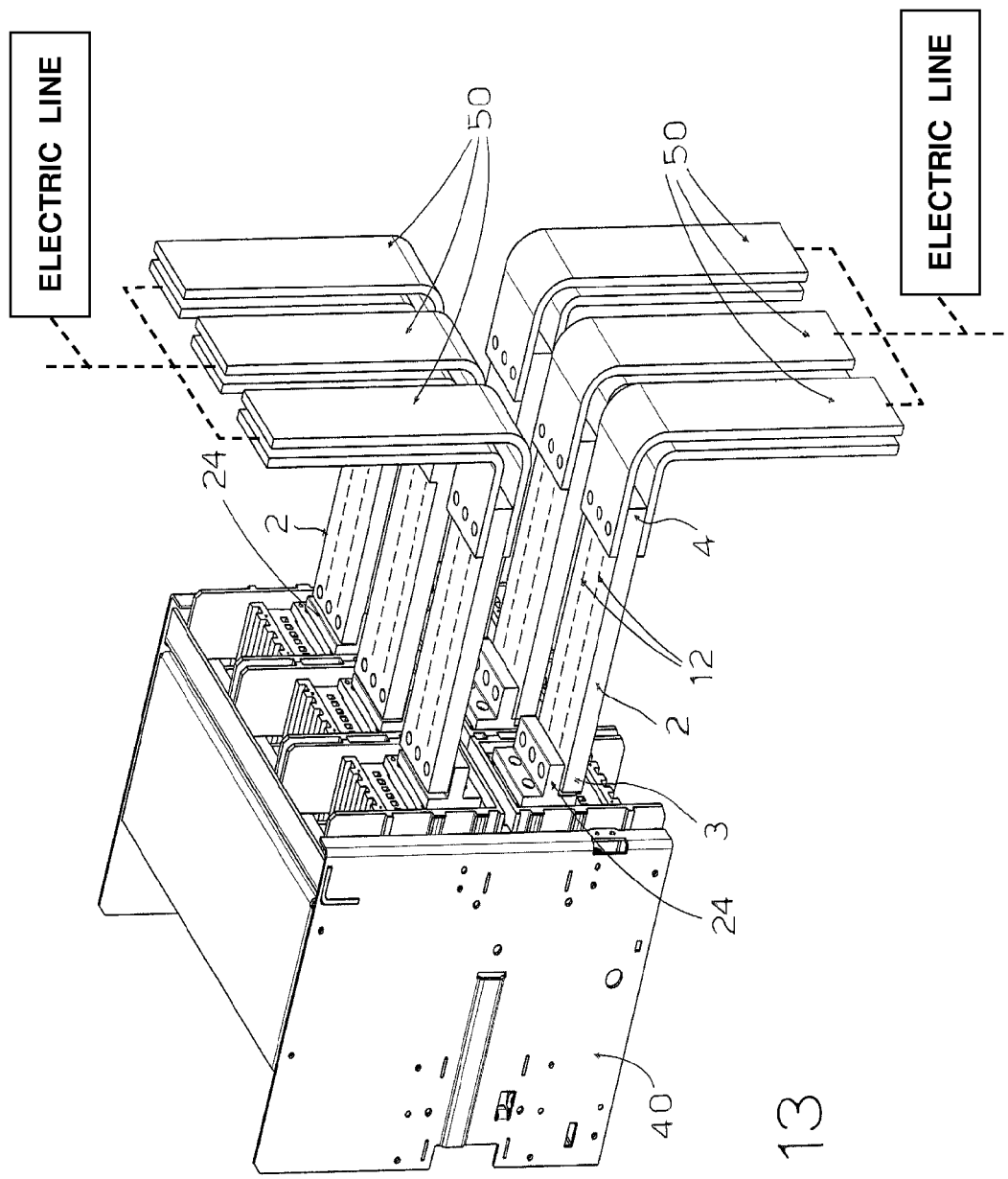
FIG. 13 is a perspective view representing the device according to the invention connected between an adapter for an electrical switchboard of the type of FIG. 4 and a bus bar system of an electric line.

In turn, the second end portion 4 is intended to be connected to a conductor element of the electric line, such as one or more bus bars 50, as illustrated for example in FIG. 13. In the example illustrated in FIGS. 1-4, the end portion 4 comprises a clip 22 for the connection towards the electric line, for example, with corresponding conductors, indicated in FIG. 4 by reference number 23; obviously, this portion 4 can be configured in an entirely different manner according to the specific application (for example fixed, withdrawable, or removable).

Figure 4:
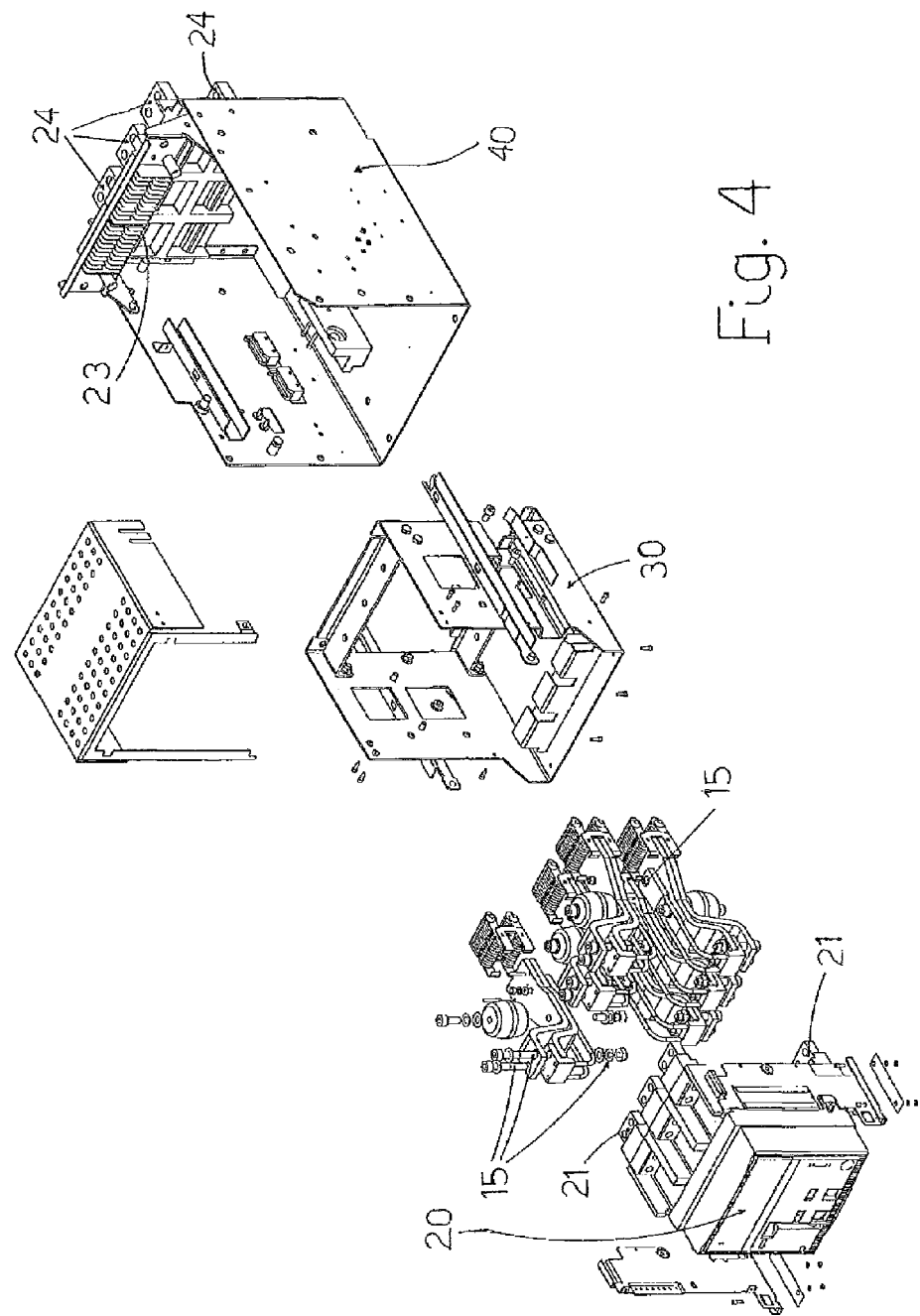
FIG. 4 is an exploded perspective view representing an interruption device of the withdrawable-type in the assembly phase inside an intermediate adapter (retrofit kit) and inside adapter for an electrical switchboard with connection devices of the type illustrated in FIGS. 1-2.

Furthermore, it should be understood that the end portion 3 can be connected directly to a terminal 21 of a circuit breaker, as illustrated in FIG. 4, or by means of inter-positioning one or more electrically conducting elements, such as, for example, cables, bus bars, etc.; similarly, the electrical chain downstream of the portion 4 can also comprise one or more interconnected electrically conducting elements.

Advantageously, the device 1 comprises at least one thermal conducting body overall indicated by reference number 10, which can also be made for example of copper, ceramic, or aluminium, or combinations thereof, or any other commercially available material suitable for this purpose and which comprises a hermetically sealed cavity 11 which contains a cooling fluid; preferably, the cavity 11 comprises a small quantity of vaporizable liquid, for example water.

Preferably, the walls of the sealed cavity 11 have porous, rough, or ribbed internal surfaces.

The thermal conducting body 10 is operatively coupled to the electrically conducting body 2 such that the hermetically sealed cavity has a first thermal exchange surface arranged in proximity to the first end portion 3 of the body 2 so as to absorb (directly or indirectly) heat produced by the terminal 21 of the circuit breaker 20, and a second thermal exchange surface, separated from the first surface, that is arranged in proximity to the second end portion 4 so as to transmit heat (directly or indirectly) towards the conductor element of the electric line.

According to the specific requirements and applications, both the electrically conducting body 2 and the thermal conducting body 10 can be variously shaped and can each be composed of a single component or of several separate and interconnected components. Also, the mutual connection between the various components of the device 1 can vary depending on the applications. In fact, the device 1 can be advantageously used both in new installations, wherein the relative position between connection points to the electric line and the terminals of the circuit breaker, can be defined in the design phase thus allowing to provide the components of the device 1 with an embodiment as simple as possible, for example, with a rectilinear development, or in retrofit applications, wherein i.e. it is to be incorporated into pre-existing installations, by replacing an obsolete circuit breaker with a new one having a totally different size. In these cases, the connection path imposed can be tortuous and therefore the connection device 1 also has components having a geometric configuration adapted to the specific case.

In particular, according to one possible embodiment (example of FIGS. 1-4), the thermal conducting body 10 is connected externally to the electrically conducting body 2.

Alternatively, the thermal conducting body 10 is operatively coupled to the electrically conducting body 2 with the hermetically sealed cavity 11 arranged at least partially inside the electrically conducting body itself.

According to another embodiment, the thermal conducting body 2 is arranged completely inside the electrically conducting body 2 (see the examples of FIGS. 5-8).

In addition, the thermal conducting body 10 is connected removably (see examples of FIGS. 1-4, FIGS. 5 and 8) to the electrically conducting body 2 so as to make it possible replacing it with an equivalent body, if necessary; or the body 10 can be coupled to the body 2 in a definitive manner, that is not separable anymore, unless through destructive interventions of the device 1, such as, for example, illustrated in FIGS. 6-7, 11-12, wherein the thermal conducting body 10 is completely embedded inside the electrically conducting body 2.

Now, referring particularly to the embodiment illustrated in FIGS. 1-4, the body 2 is constituted by two shaped rigid bus bars that are electromechanically coupled to each other, for example screwed together (see FIGS. 3 and 4); in turn, the thermal conducting body 10 comprises at least one hermetically-sealed hollow tubular element 12, preferably, a plurality of hermetically-sealed hollow tubular elements 12 that run parallel to each other. The inside walls of these tubular elements 12 thus constitute surfaces delimiting the respective cavities 11, each of which contains the cooling fluid.

In this example embodiment, two suitably shaped plates 13, 14 are further provided, which are also made of thermal conducting material, such as, for example, aluminium or copper. The two plates 13 and 14 are arranged at opposite ends of the plurality of tubular elements 12 (in the example illustrated, two) and are appropriately connected to the ends of the tubes themselves 12; in this way, the plates perform a function of structural "binder" among the various tubes 12 and act also as heat collector/diffuser from/to the tubes 12 themselves. The thermal conducting body 10 is in this case externally connected, preferably removably, to the electrically conducting body 2; to this end, the plates 13 and 14 are equipped with suitable holes capable of receiving fastening screws-nuts 15, such as those, for example, visible in FIGS. 3 and 4.

In the embodiments illustrated schematically in FIGS. 6, 7, 9 and 10, the body 2 is represented for simplicity sake as constituted by a single block regularly shaped, for example a parallelepiped.

Figure 6:
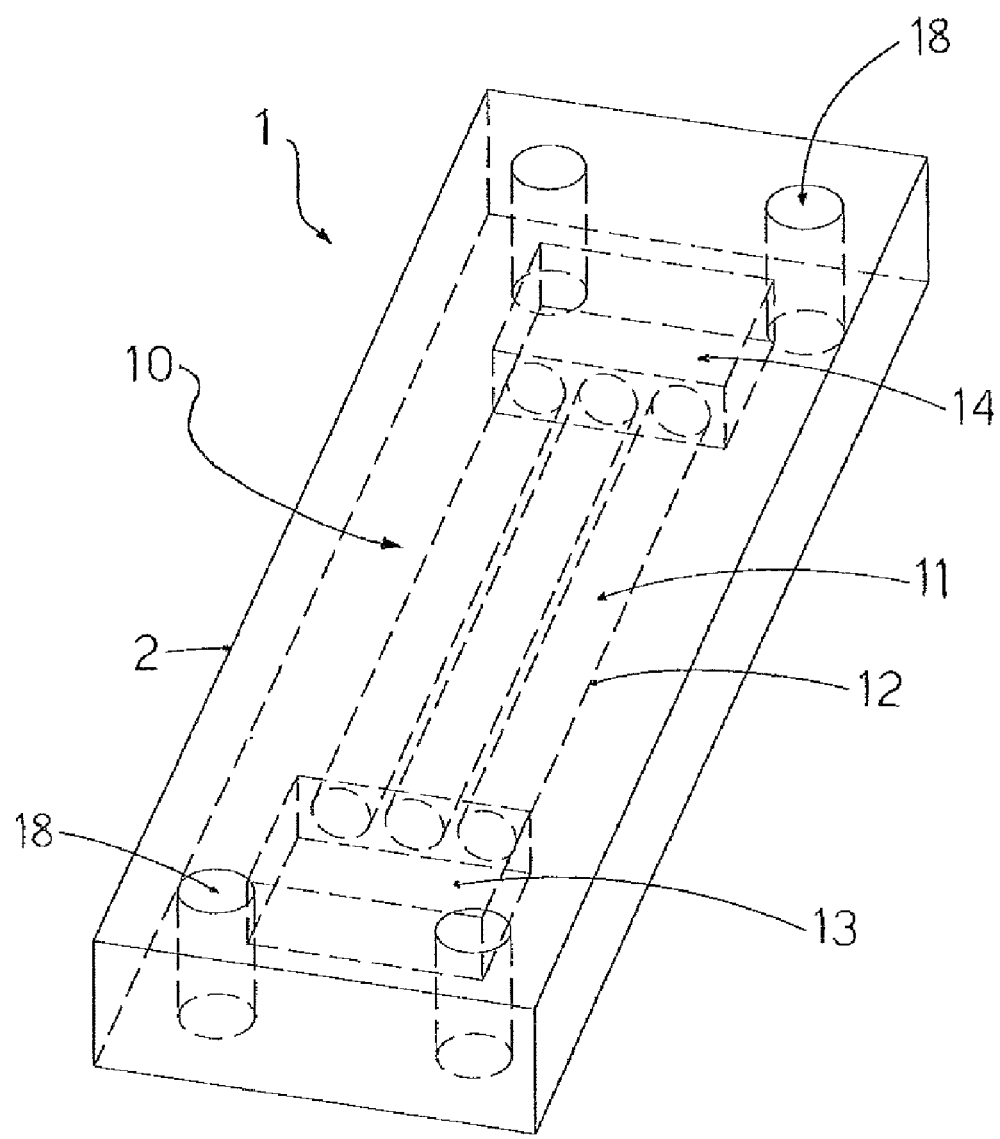

In turn, in the example of FIG. 6, the thermal conducting body 10 has a structure that is similar to that illustrated in FIGS. 1-4, thus comprising a plurality of hermetically sealed hollow tubular elements 12, for example three, connected at their opposite ends to the two plates 13 and 14. In particular, in this embodiment example, the thermal conducting body 10 is completely embedded inside the electro-conducting body 2. Such solution can be made, for example, by "building" the block of the body 2 around the body 10, starting from metallic powders that are consolidated according to metallurgical technologies and processes, which are well known in the art and will not be thereby described in detail. For example, co-moulding techniques can be used, related to the powder technology or pouring "casting".

Figure 7:
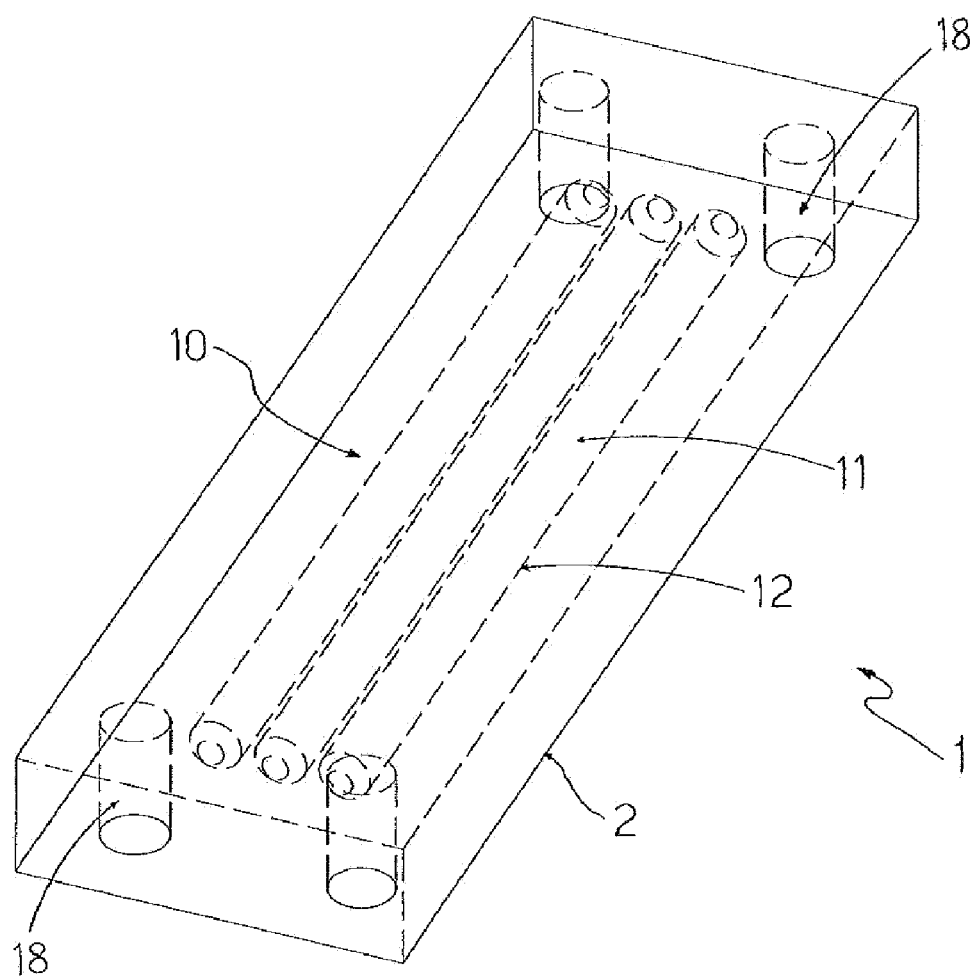

A similar solution is represented in the embodiment example of FIG. 7 wherein, unlike the example of FIG. 6, the thermal conducting body 10 does not comprise plates 13 and 14, but comprises only a plurality of hermetically sealed hollow tubular elements 12, embedded inside the block 2.

Figure 5:
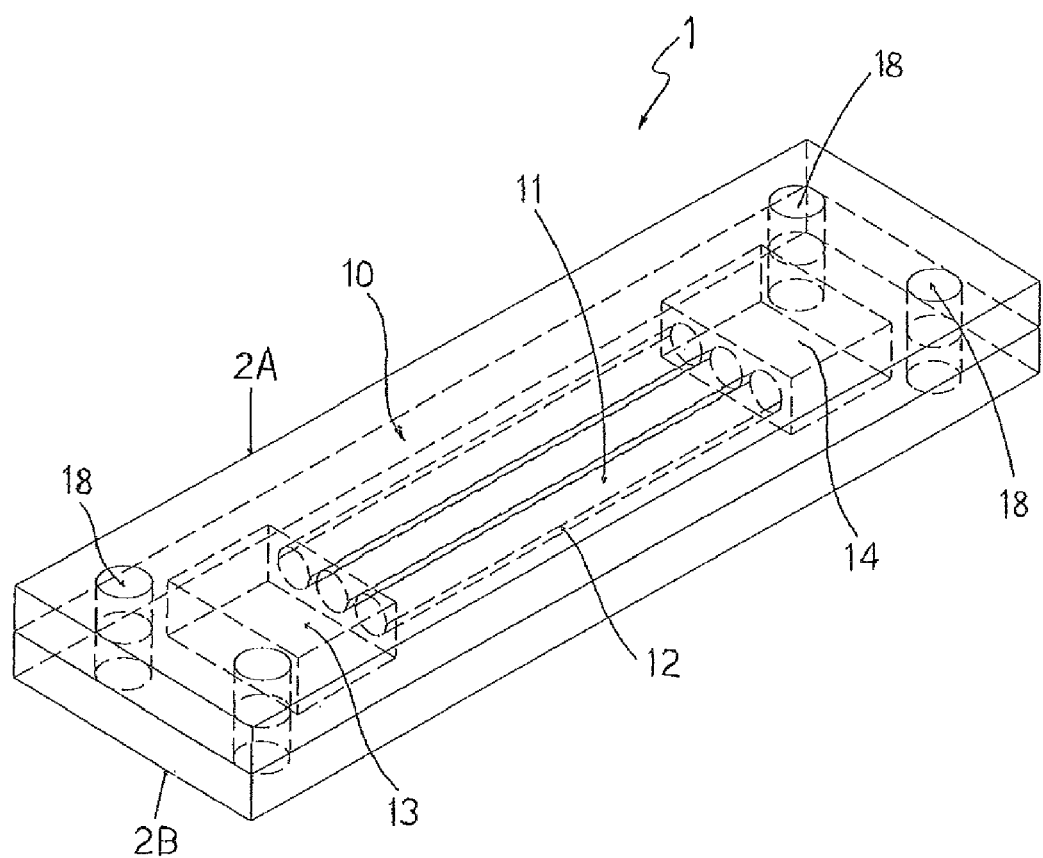
FIGS. 5-10 are perspective schematic views of possible embodiments of the connection device according to the invention.
Figure 8:
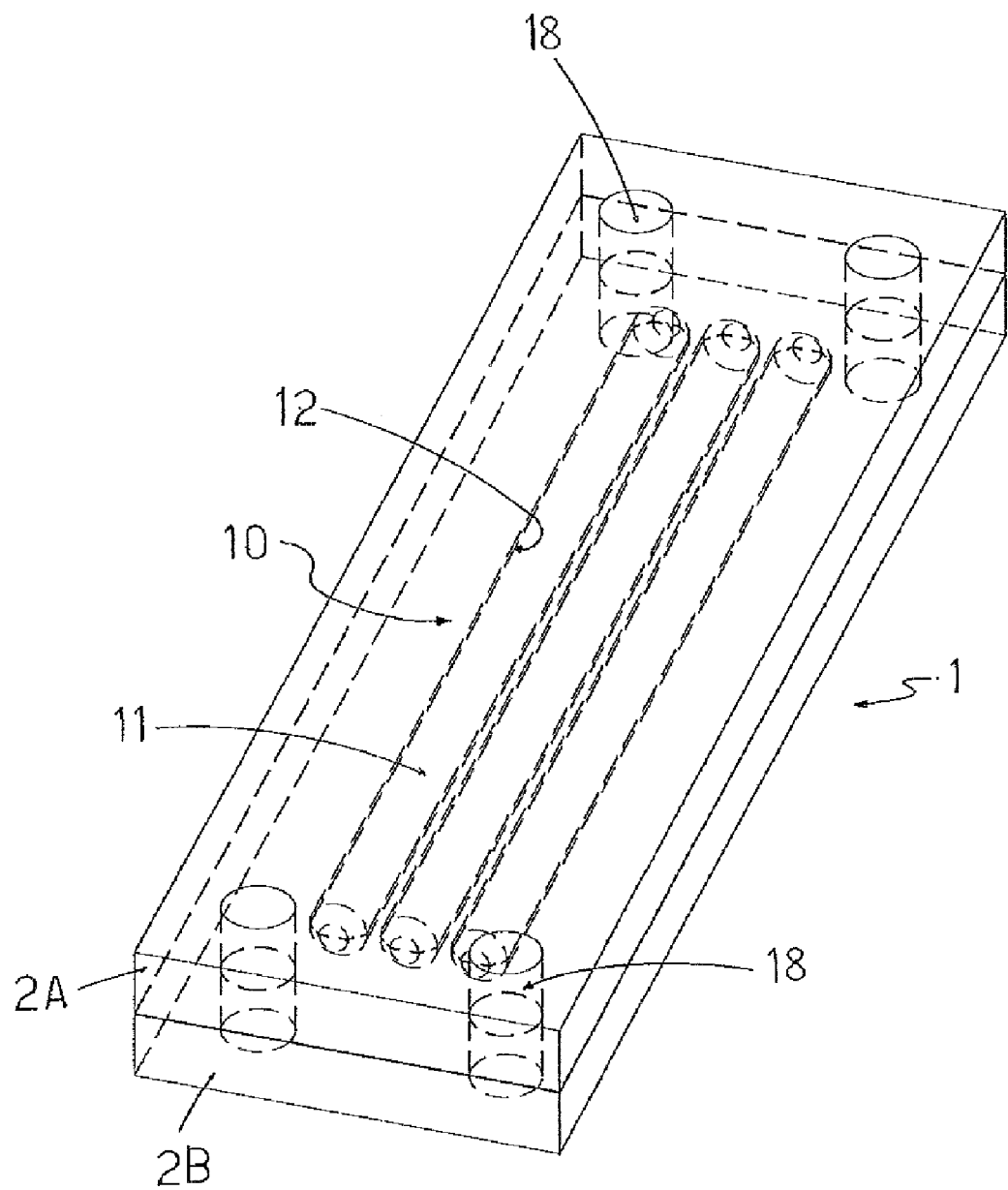

In the exemplary embodiments illustrated schematically in FIGS. 5 and 8, the electro-conducting body 2 comprises a sandwich structure having two parts 2A and 2B, mutually coupled in such a way as to define one or more internal seats inside which the thermal conducting body 10 is housed. The two parts 2A and 2B, which in the example of FIGS. 5 and 8 are also constituted by two parallelepiped blocks, once the body 10 is housed, can be mutually attached definitively, such as, for example, by soldering, or they can be connected in a separable way, if necessary, for example by screwing them, so that with this latter solution the conducting body 10 is removably coupled to the body 2. In practice, if necessary, it would be enough to unscrew the two appropriately prearranged parts 2A and 2B, and to insert the components forming the body 10.

In turn, the thermal conducting body 10 comprises, for example, a structure similar to that of FIG. 6 that is housed inside the seat defined by the two parts 2A, 2B (FIG. 5), or a structure similar to that of FIG. 7, namely it comprises one, or preferably a series of, hermetically sealed hollow tubular elements 12 which are arranged inside one or several seats defined by the semi-blocks 2A, 2B (FIG. 8).

Figure 9:
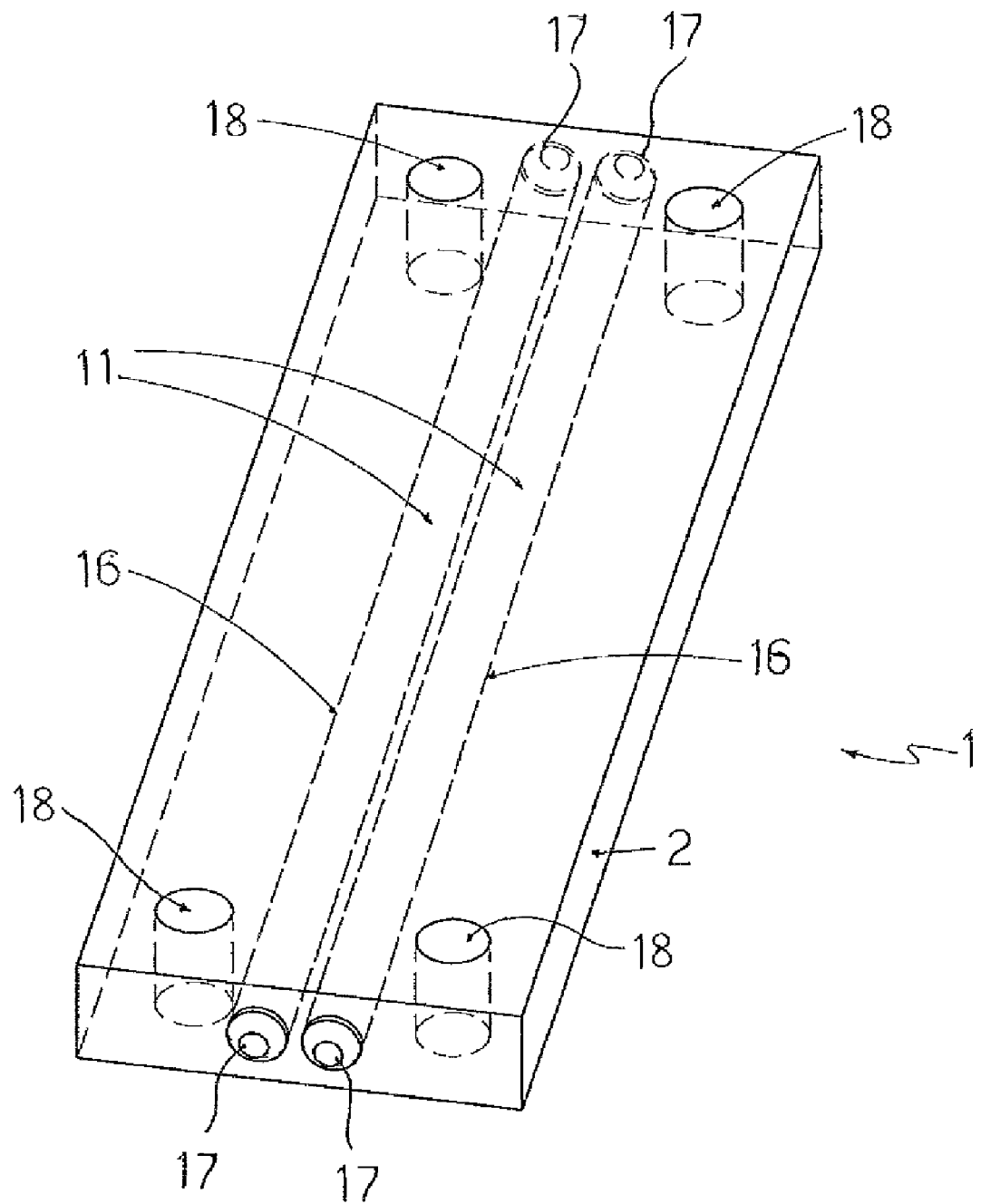
Figure 10:
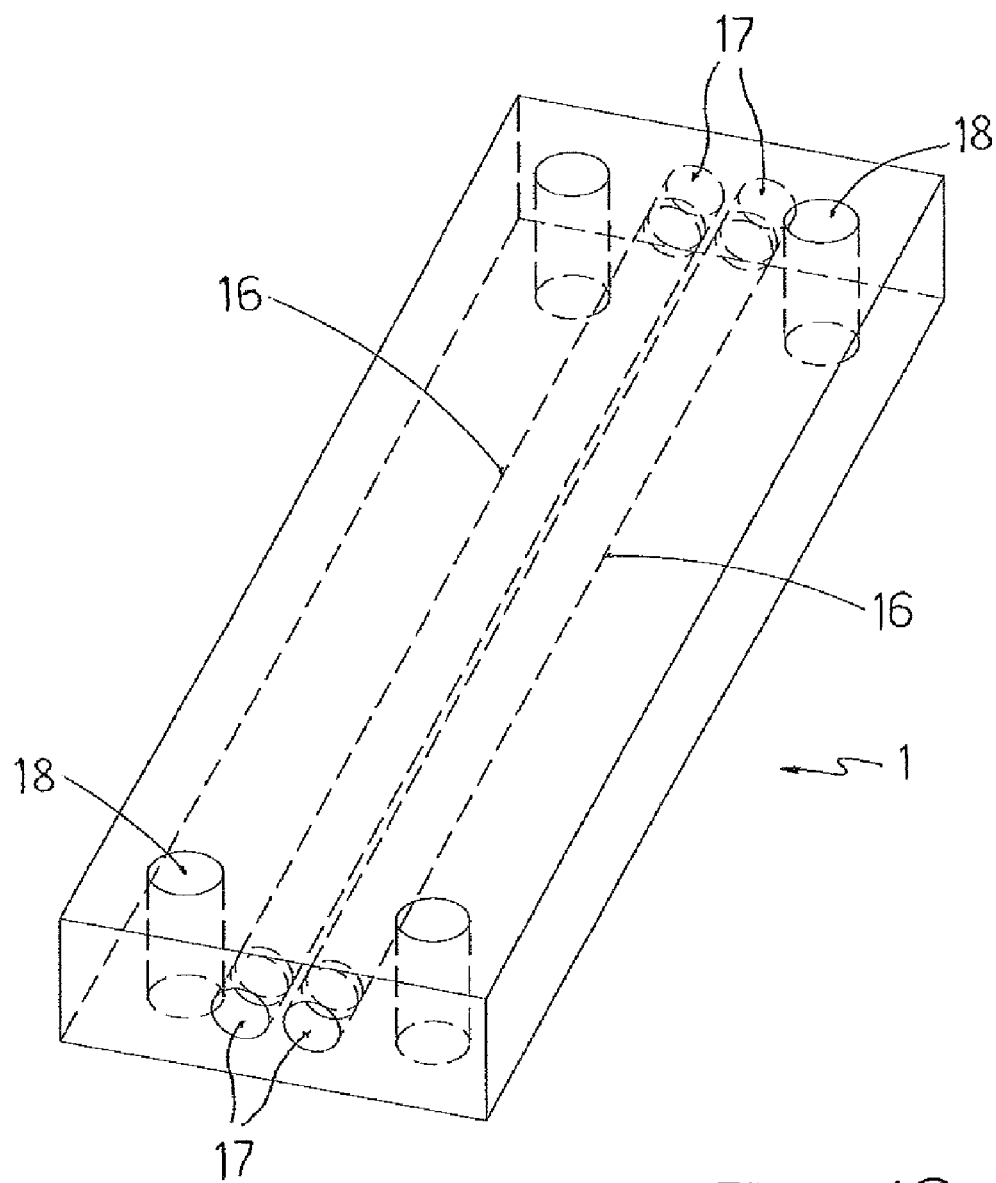

In another embodiment illustrated in FIGS. 9 and 10, the walls of a sealed cavity 11 consist at least partially of surfaces of the electrically conducting body 10; in this case, the body 2 can be made by providing it directly with one or more through channels 16 for example, by means of drilling or extrusion. In this example, hence, the thermal conducting body 10 comprises the sealed cavity formed by a through channel 16 along the development of the electro-conducting body 2 and, for each through channel 16, one pair of closing elements 17, such as, for example, plugs made of sealing material. It is to be noted that in the solution of FIG. 9, the electro-conducting body 2 and the thermal conducting body 10 are substantially structurally coincident.

Alternatively, on the inside of each channel 16 (which in this case can be a totally or partially through channel) a hollow tubular element 12 hermetically sealed and containing the cooling fluid can be inserted directly.

In this case and in all solutions wherein the electro-conducting body 2 and the thermal conducting body 10 are held in contact with mechanical means, at the time of assembly, fluids can be added (as thermal conducting pastes or gels), in order to optimize thermal conduction, particularly with regard to the ends of the thermal conducting body 10 or of the plates 13, 14.

In another preferred embodiment illustrated in FIGS. 11 and 12, a seat 19 open to the external surface of the appropriately configured body 2 itself is obtained, for example, by milling. In this case, the thermo-conducting body 10 comprises at least one hermetically sealed hollow tubular element 12 shaped, for example, so as to replicate the pattern of the seat 19. The tubular element is inserted inside the seat 19 and sealed, for example by means of brazing using, for example, a metal-based paste 20. In particular, a brazing alloy, characterized by a melting point that is low enough to enable brazing without damaging the tubular element 12, but high enough to resist once the device 1 is used in the electrical equipment, is used preferably as the sealing element. For example, in order to obtain melting points between 140° C. and 270° C., an alloy of tin and bismuth in variable proportions, but with a prevalence of tin, can be used.

After brazing by casting, for example, grinding can be performed to eliminate any stocks. In this way, a clean external surface can be obtained with the tubular element completely embedded in the seat 19 and covered by a sealing.

Finally, also in the various schematic shapes of FIGS. 5-12, the body 2 is provided with transverse holes 18 suitable for receiving means for connecting with the terminal of a circuit breaker and with a conductor element of the associated electric line.

It has been observed in practice, how the device 1 according to the invention allows to accomplish the intended scope by providing several significant improvements with regard to known solutions. In fact, the device 1 combines the element 2 used for electrically connecting the circuit breaker to the line, with a cooling device 10 that has: a warmer section that is placed in proximity to the terminals of the circuit breaker that are placed in direct contact with the real breaking part inside the circuit breaker, that is with the part of the circuit breaker that can reach the highest temperatures; and a "cooler" section separated from the warmer section that can be found at any point of the electrical connection, preferably towards an area of the body 2 connecting to the elements of the electric line. In practice, the warmer section acts as an evaporator for the cooling fluid placed inside the sealed cavity, while the cooler section acts as a condenser; basically, a "thermal short circuit" is achieved between the two sections of the electrical chain characterized by very different temperatures, wherein the device 10 absorbs heat at its warmer section (the circuit breaker terminals), transferring it towards the cooler section such that it is then further transferred to the areas in contact with it (towards the electric line).

For example, simulating that the temperature of the operating terminals is initially T1 (terminals)=130° C. and that the temperature at the connection area with the line, is T2=100° C., by equipping the connectors of each terminal (upper and lower) with two tubular elements having a diameter of 6 mm (a total of 12 tubes), an approximate extractable power of each heat pipe=15 W could be achieved and thus the total extractable power would be equal to 180 W. As a result, the temperature of the terminals would be T1 (terminals)=105° C., while the temperature at the second connection area (cold area towards the electric line) would remain substantially unchanged, because in that area the thermal capacity of the system is very high compared to the modest amount of heat extracted.

In addition, it should be noted that the device 1 has a simple structure that can be quickly and effectively installed in a low voltage system without the need for special prearrangements, and can be sold as a kit for application to any type of switching device that would require its usage.

In particular, the device 1 designed in this way is perfectly adaptable to either fixed, extractable, or removable-type circuit breakers. In the application with fixed circuit breakers, the device 1 is applied, preferably directly, between terminals 21 of the circuit breaker and the bus bars of the electrical system.

In applications of the removable or withdrawable types the device 1 can be applied to the intermediate bus bars that connect the switch terminals to the conductors, for example, plug-in couplings (plug-socket) of an adapter (e.g. FIGS. 4 and 13), or downstream of the adapter, between the terminals of the adapter and the bus bar system of the electric line. For example, in FIG. 4 a circuit breaker 20 in a withdrawable execution is illustrated, which comprises an intermediate adapter 30 and an adapter 40 for an electrical switchboard. The switchboard adapter 40 comprises on the internal surface of its bottom wall, a series of connection elements 23 for connection (also here direct or indirect) to the corresponding terminals 21 of the circuit breaker, and on the external part, a series of connection terminals 24 for connection to the electric line, such as, for example, to a system of shaped bus bars. In this case, each device 1 can be connected to the terminal 24 from on side and, to the corresponding bus bar 50 (or interposed element) from the other side, as illustrated in FIG. 13, wherein the tubular elements 12 are schematically indicated by dashed lines.

Hence, another object of the present invention is constituted by an electrical switching device, in particular low voltage circuit breaker, be it in a fixed, removable, or withdrawable execution, having a pair of mutually separable/couplable contacts for opening/closing an associated electric line, and a plurality of input and output connection terminals with said electric line, characterized in that it comprises at least one device 1, according to what described and defined in the appended claims.

In this way, all conditions being equal, the use of a device 1 allows to have a circuit breaker with a rating higher than an identical circuit breaker which is not provided with such a device 1. Obviously, such device can be commercially sold as a complete circuit breaker (fixed execution) or as part of a withdrawable or removable circuit breaker, mainly comprising the withdrawable or removable breaking part that will then be coupled with a fixed part, whether equipped or not with adapters of the type indicated by 30, 40.

In addition, such device 1 can be used together with a circuit breaker for application in any type of electrical switchboard such as, for example, in retrofitting operations, or can be installed inside a switchboard by simply combining it with an already existing circuit breaker for connecting it to an associated electric line, and can be installed indifferently in a distribution bus bar system having a horizontal- or vertical-development. Therefore, another object of the present invention is an electrical switchboard comprising a circuit breaker having a plurality of terminals for input and output electrical connection with an electric line, characterized in that it comprises at least one device 1 for connecting said electric line to one of said terminals as previously described and as defined in the appended claims. In this manner, greater electrical power is drawn compared to what normally is estimated for the cubicle of a known switchboard, so as to be able of having extremely compact, efficient and high-energy efficiency equipment solutions.

The device 1 thus conceived is susceptible to numerous changes and variants, all of which are in the scope of the inventive concept; additionally, all details can be replaced by other equivalent technical elements. For example, the number of tubular elements as well as their configuration, e.g. rectilinear, curved, or mixed can be varied; the plates can be replaced by other elements, such as clamps or tie-rods, thermal conducting paste or gel can be used for increasing efficiency; or the body 2 can be shaped/dimensioned in an entirely different manner such as, for example, with sections stepped, curved, etc. Further, it is possible to perform any combination of the illustrative examples previously described. In practice, the materials, as well as the dimensions, can be of any kind depending on the requirements and state of the art.

What is claimed is:

1. A device for connecting an electric line to a connection terminal for direct or indirect connection with a circuit breaker, the device comprising:
    at least one first electrically conducting body having a first end portion for electrical connection to said terminal, and a second end portion for electrical connection to a conductor element of said electric line; and
    at least one thermal conducting body comprising a hermetically sealed cavity containing a cooling fluid, said thermal conducting body being operatively coupled to said first electrically conducting body such that said hermetically sealed cavity has a first thermal exchange surface arranged in proximity to said first end portion which absorbs heat produced by said terminal and a second surface arranged in proximity to said second end portion which transmits the heat absorbed toward said conductor element of said electric line.

2. A device according to claim 1, wherein said at least one thermal conducting body is connected externally to the first electrically conducting body.

3. A device according to claim 1 wherein said at least one thermal conducting body is operatively coupled to the first electrically conducting body with said hermetically sealed cavity arranged at least partially inside the first electrically conducting body itself.

4. A device according to claim 1 wherein said at least one thermal conducting body is positioned completely inside the first electrically conducting body.

5. A device according to claim 4 wherein said first electrically conducting body comprises a sandwich structure having two parts mutually coupled so as to define a seat inside which said at least one thermal conducting body is housed.

6. A device according to claim 1 wherein said at least one thermal conducting body is removably connected to the first electrically conducting body.

7. A device according to claim 4 wherein said at least one thermal conducting body is embedded inside said first electrically conducting body.

8. A device according to claim 1 wherein the walls of said sealed cavity are constituted at least in part by surfaces of said first electrically conducting body.

9. A device according to claim 8 wherein said sealed cavity is constituted by a through channel along the development of said first electrically conducting body, and said at least one thermal conducting body comprises a pair of closing elements applied to the end of said through channel so as to seal it hermetically.

10. A device according to claim 1 wherein said at least one thermal conducting body comprises at least one hermetically sealed hollow tubular element containing said cooling fluid.

11. A device according to claim 1 wherein said first electrically conducting body comprises a shaped body having a seat open towards the external of the first electrically conducting body itself, and in that said at least one thermal conducting body comprises at least one hermetically sealed hollow tubular element containing said cooling fluid, said at least one thermal conducting body being inserted into said open seat and being sealed by means of a metal-based paste.

12. A device according to claim 10 wherein said at least one thermal conducting body comprises a first plate and a second plate arranged at opposite ends of said tubular element.

13. An electrical switchboard comprising a circuit breaker having a plurality of terminals for input and output electrical connection with an electric line, wherein the electrical switchboard comprises at least one device for connecting said electric line to one of said terminals, said at least one device comprising:
    at least one first electrically conducting body having a first end portion for electrical connection to said terminal, and a second end portion for electrical connection to a conductor element of said electric line; and
    at least one thermal conducting body comprising a hermetically sealed cavity containing a cooling fluid, said thermal conducting body being operatively coupled to said first electrically conducting body such that said hermetically sealed cavity has a first thermal exchange surface arranged in proximity to said first end portion which absorbs heat produced by said terminal and a second surface arranged in proximity to said second end portion, said thermal conducting body transmitting the absorbed heat toward said conductor element of said electric line.

14. An electrical switching device having a pair of mutually separable/couplable contacts for opening/closing an associated electric line, and a plurality of input and output connection terminals with said electric line, wherein the electrical switching device comprises at least one connection device comprising:
    at least one first electrically conducting body having a first end portion for electrical connection to one of said terminals, and a second end portion for electrical connection to a conductor element of said electric line; and
    at least one thermal conducting body comprising a hermetically sealed cavity containing a cooling fluid, said thermal conducting body being operatively coupled to said first electrically conducting body such that said hermetically sealed cavity has a first thermal exchange surface arranged in proximity to said first end portion which absorbs heat produced by said terminal and a second surface arranged in proximity to said second end portion, said thermal conducting body transmitting the absorbed heat toward said conductor element of said electric line.

* * * * *